United States Patent
Elton et al.

(10) Patent No.: US 9,403,447 B2
(45) Date of Patent: Aug. 2, 2016

(54) VEHICLE SEAT INCLUDING AN INTERLOCK ASSEMBLY

(71) Applicants: Robert Elton, Ann Arbor, MI (US); Gurminder Rai, Northville, MI (US)

(72) Inventors: Robert Elton, Ann Arbor, MI (US); Gurminder Rai, Northville, MI (US)

(73) Assignee: FCA US LLC, Auburn Hills, MI (US)

( * ) Notice: Subject to any disclaimer, the term of this patent is extended or adjusted under 35 U.S.C. 154(b) by 76 days.

(21) Appl. No.: 14/278,084

(22) Filed: May 15, 2014

(65) Prior Publication Data

US 2015/0329014 A1    Nov. 19, 2015

(51) Int. Cl.
 *B60N 2/20* (2006.01)
 *B60N 2/235* (2006.01)
 *B60N 2/30* (2006.01)
 *B60N 2/36* (2006.01)

(52) U.S. Cl.
 CPC *B60N 2/20* (2013.01); *B60N 2/235* (2013.01); *B60N 2/2352* (2013.01); *B60N 2/305* (2013.01); *B60N 2/3011* (2013.01); *B60N 2/366* (2013.01)

(58) Field of Classification Search
 CPC .................................................. B60N 2/2352
 USPC ...................... 297/326, 336, 325, 341, 378.12
 See application file for complete search history.

(56) References Cited

U.S. PATENT DOCUMENTS

| | | | |
|---|---|---|---|
| 5,280,995 A | 1/1994 | Elton | |
| 6,290,297 B1 | 9/2001 | Yu | |
| 6,345,867 B1 * | 2/2002 | Hellrung | B60N 2/01583 296/65.03 |
| 6,464,299 B1 * | 10/2002 | Castagna | B60N 2/206 297/378.12 |
| 6,513,876 B1 * | 2/2003 | Agler | B60N 2/206 297/378.12 |
| 6,578,919 B2 * | 6/2003 | Seibold | B60N 2/045 296/65.05 |
| 6,793,285 B1 * | 9/2004 | Tame | B60N 2/3011 296/65.01 |
| 6,910,739 B2 * | 6/2005 | Grable | B60N 2/2354 296/65.09 |
| 6,926,362 B2 * | 8/2005 | Kroner | B60N 2/20 297/354.12 |
| 7,097,252 B2 * | 8/2006 | Becker | B60N 2/20 297/378.12 |
| 7,152,923 B2 * | 12/2006 | Charras | B60N 2/2352 297/341 |

(Continued)

*Primary Examiner* — Timothy J Brindley
(74) *Attorney, Agent, or Firm* — Ralph E. Smith

(57) ABSTRACT

A vehicle seat comprises a latch mechanism, a seat frame bracket, a seat back bracket and an interlock assembly. The interlock assembly is configured to inhibit movement of the seat back bracket from the folded position to the upright position when the latch mechanism is in an unlatched condition. The interlock assembly includes a lever movable between an extended position and a retracted position. The lever is coupled to the latch mechanism such that movement of the latch mechanism from the latched condition to the unlatched condition moves the lever to the extended position. The lever is coupled to the latch mechanism such that movement of the latch mechanism from the unlatched condition to the latched condition permits the lever to move to the retracted position.

16 Claims, 5 Drawing Sheets

(56) References Cited

U.S. PATENT DOCUMENTS

| | | | |
|---|---|---|---|
| 7,198,316 B2 * | 4/2007 | Lutzka | B60N 2/01583 296/65.03 |
| 7,434,883 B2 * | 10/2008 | Deptolla | B60N 2/123 297/15 |
| RE41,964 E | 11/2010 | Hellrung et al. | |
| 7,871,127 B2 * | 1/2011 | Bruck | B60N 2/20 297/378.1 |
| 8,408,648 B2 | 4/2013 | Champ | |
| 8,430,455 B2 * | 4/2013 | Douceau | B60N 2/20 297/378.12 |
| 8,544,956 B2 * | 10/2013 | Park | B60N 2/01583 297/326 |
| 2004/0021355 A1 * | 2/2004 | Ohba | B60N 2/06 297/341 |
| 2004/0036339 A1 * | 2/2004 | Christoffel | B60N 2/206 297/367 R |
| 2006/0061183 A1 * | 3/2006 | White | B60N 2/01583 297/378.12 |
| 2006/0113828 A1 * | 6/2006 | Ryan | B60N 2/3031 297/336 |
| 2006/0250013 A1 | 11/2006 | Shao | |
| 2009/0001796 A1 * | 1/2009 | Krahn-Lau | B60N 2/3011 297/354.12 |
| 2009/0001797 A1 * | 1/2009 | Neumann | B60N 2/123 297/378.12 |
| 2010/0244524 A1 * | 9/2010 | Kumazaki | B60N 2/12 297/341 |
| 2010/0295355 A1 * | 11/2010 | Schmodde | B60N 2/015 297/354.12 |
| 2011/0018326 A1 * | 1/2011 | Sayama | B60N 2/2356 297/378.14 |
| 2013/0147249 A1 | 6/2013 | Champ et al. | |

* cited by examiner

VEHICLE SEAT INCLUDING AN INTERLOCK ASSEMBLY

FIELD

The present disclosure relates generally to an interlock mechanism for a vehicle seat.

BACKGROUND

Vehicle seats, such as seats in the rear of a sport utility vehicle, are typically capable of being folded down such that the seat back is proximate the seat bottom. Such folding flat capability provides additional cargo room in the vehicle when there no passengers in the back seats. Additionally, it is not uncommon for such seats to be configured to release from the vehicle floor at a back connection point and pivot forward such that passengers are able to enter the vehicle more easily, such as to gain access to a third row of vehicle seats.

SUMMARY

In one form, a vehicle seat is provided in accordance with the teachings of the present disclosure. In some example embodiments, the vehicle seat comprises a latch mechanism, a seat frame bracket, a seat back bracket and an interlock assembly. The latch mechanism is movable between a latched condition and an unlatched condition. The seat frame bracket is coupled to the latch mechanism and is configured to be releasably secured to a vehicle floor via the latch mechanism. The seat back bracket is rotatably coupled to the seat frame bracket. Further, the seat back bracket is movable between an upright position and a folded position. The interlock assembly is configured to inhibit movement of the seat back bracket from the folded position to the upright position when the latch mechanism is in the unlatched condition.

In some examples, the interlock assembly includes a lever movable between an extended position and a retracted position. The lever is coupled to the latch mechanism such that movement of the latch mechanism from the latched condition to the unlatched condition moves the lever to the extended position. Further, the lever is coupled to the latch mechanism such that movement of the latch mechanism from the unlatched condition to the latched condition permits the lever to move to the retracted position.

In some embodiments, the lever in the extended position extends into a notch defined by the seat back bracket. Further, the seat back bracket defines a contact surface proximate the notch, the contact surface contacting the lever in the extended position and acting as a mechanical stop such that the seat back bracket is inhibited from moving from the folded position to the upright position.

In further examples, the latch mechanism is inhibited from moving from the latched condition to the unlatched condition when the seat back bracket is in the upright position. When the seat back bracket is in the upright position, movement of the lever from the retracted position to the extended position is inhibited by contacting the seat back bracket.

In another form, a vehicle seat of a different configuration is provided in accordance with the teachings of the present disclosure. In some example embodiments, the vehicle seat comprises a latch mechanism, a seat frame bracket, a seat back bracket and an interlock assembly. The latch mechanism is movable between a latched condition and an unlatched condition. The seat frame bracket is coupled to the latch mechanism and is configured to be releasably secured to a vehicle floor via the latch mechanism. The seat back bracket is rotatably coupled to the seat frame bracket. Further, the seat back bracket is movable between an upright position and a folded position.

The interlock assembly is configured to inhibit movement of the seat back bracket from the folded position to the upright position when the latch mechanism is in the unlatched condition and to inhibit movement of the latch mechanism from the latched condition to the unlatched condition when the seat back bracket is in the upright position. The interlock assembly includes a lever, a lever biasing member and a pawl. The lever is movable between an extended position and a retracted position. The lever biasing member is coupled to the lever and seat frame bracket and is configured to bias the lever to the retracted position. The pawl is rotatably coupled to the seat frame bracket. The pawl couples the latch mechanism to the lever such that movement of the latch mechanism from the latched condition to the unlatched condition rotates the pawl and moves the lever to the extended position. Further, the pawl couples the latch mechanism to the lever such that movement of the latch mechanism from the unlatched condition to the latched condition permits the pawl to rotate and the lever to move to the retracted position.

In some embodiments, the interlock assembly further includes a pawl biasing member configured to bias the pawl to permit the lever to move the retracted position. In various examples, the pawl biasing member comprises a coil spring extending between the latch mechanism and the pawl.

The lever in the extended position extends into a notch defined by the seat back bracket in some example constructions of the vehicle seat. Further, the seat back bracket defines a contact surface proximate the notch. The contact surface contacts the lever in the extended position and acts as a mechanical stop such that the seat back bracket is inhibited from moving from the folded position to the upright position. Furthermore, in some implementations, when the seat back bracket is in the upright position, movement of the lever from the retracted position to the extended position is inhibited by contacting the seat back bracket.

The lever directly contacts the pawl in some example embodiments. Additionally or alternatively, the latching mechanism includes a lock member rotatably secured to the seat frame bracket, where the lock member is configured to rotate between the latched condition and the unlatched condition. The lock member directly contacts the pawl and the pawl directly contacts the lever in various embodiments. Additionally, in some implementations the vehicle seat further comprises a guide mechanism coupled to the seat frame bracket, the lever being positioned between the guide mechanism and the seat frame bracket.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As briefly mentioned above, some vehicle seats are capable of being folded down such that the seat back is proximate and substantially parallel to the seat bottom. Additionally, some of these seats are configured to release from the vehicle floor at a back connection point and pivot forward, e.g., in order to provide a passenger with greater access to a third row of vehicle seats.

It is desirable to inhibit the seat back of such seats from moving from the folded position to the upright position when the vehicle seat is not fully secured to the vehicle floor. This construction will prevent or inhibit a passenger from sitting in the seat unless the seat is fully secured to the vehicle floor. Additionally or alternatively, in some cases it is desirable to inhibit the seat from being unsecured from the vehicle floor when the seat back is in the upright position. An easily constructed, lightweight, low-cost and durable interlock assembly that provides one or both of these benefits would be desirable for vehicle seat manufacturers.

Figure 1:
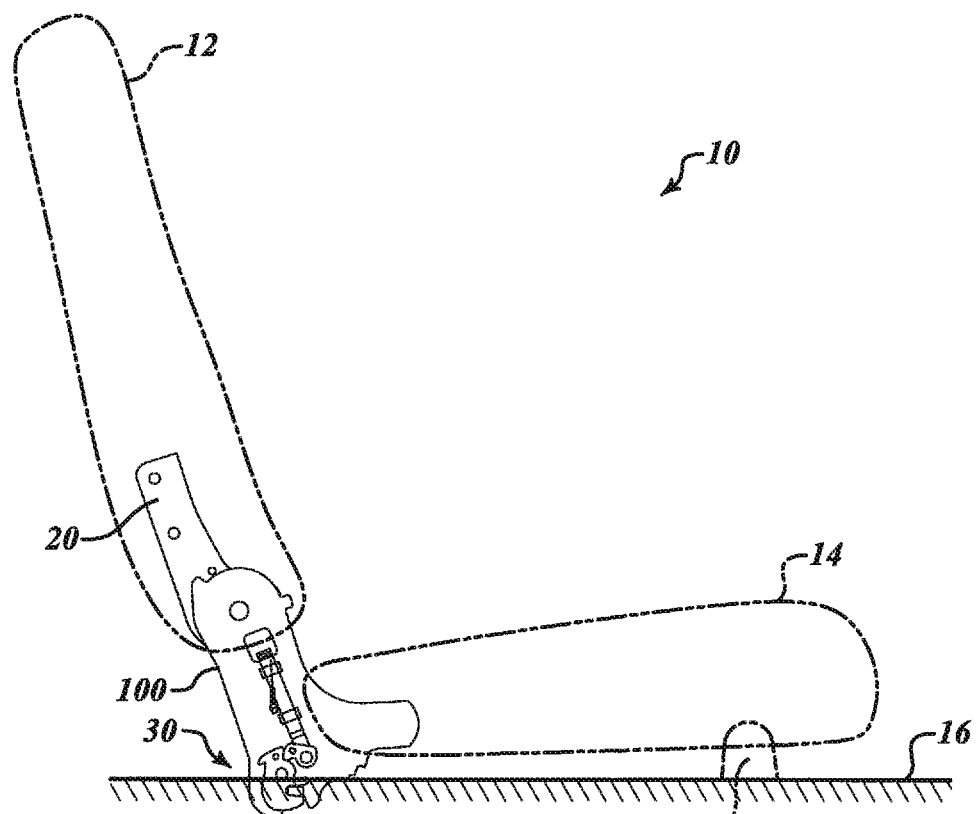
FIG. 1 is a schematic side view of an example vehicle seat in the upright position according to the principles of the present disclosure.
Figure 2:
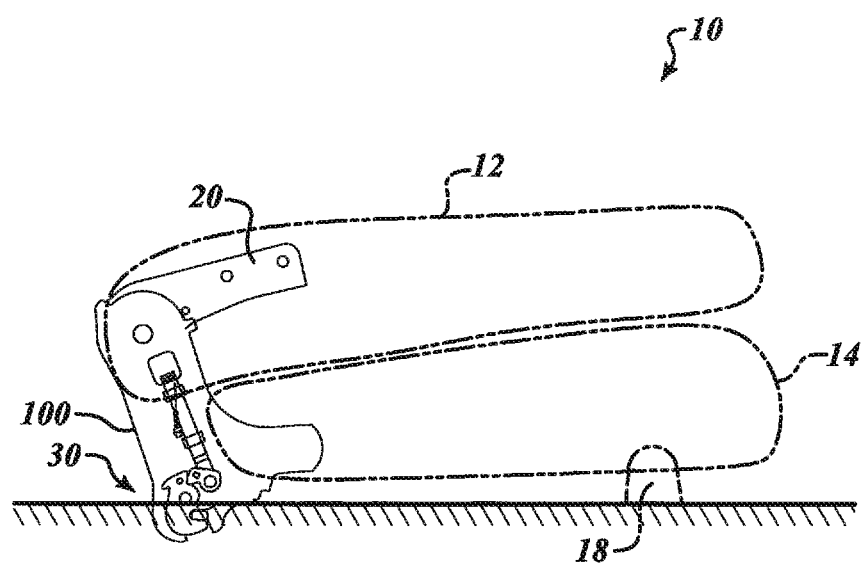
FIG. 2 is a schematic side view of the example vehicle seat of FIG. 1 in the folded position.

With reference to FIGS. 1 and 2, an example vehicle seat in accordance with some embodiments of the present disclosure is schematically shown and generally identified at reference numeral 10. The vehicle seat 10 includes a seat back 12 and a seat bottom 14. The seat back 12 is coupled to a seat back bracket 20. The seat back bracket 20 is further coupled to a seat frame bracket 100, which is further described below. The seat bottom 14 is also coupled to the seat frame bracket 100, e.g., through a seat bottom bracket (not shown).

The vehicle seat 10 is configured to be movable between an upright position (FIG. 1) and a folded position (FIG. 2). In order to provide this functionality, the seat back bracket 20 is rotatably coupled to the seat frame bracket 100 such that the seat back bracket 20 is also movable to the upright and folded positions. The vehicle seat 10 further includes a latch mechanism 30 coupled to the seat frame bracket 100 that is movable between a latched condition and an unlatched condition to releasably secure the vehicle seat 10, e.g., via the seat frame bracket 100, to a vehicle floor 16.

In the illustrated example, the latch mechanism 30 selectively secures the vehicle seat 10 to the vehicle floor 16 at the rear, and a front connecting member 18 secures the vehicle seat 10 to the vehicle floor 16 at the front. In some embodiments, the front connecting member 18 allows the vehicle seat 10 to pivot about the front connecting member 18, e.g., in order to provide a passenger with greater access to a third row of vehicle seats. In some embodiments, the latch mechanism 30 will include a lock member 32 rotatably secured to the seat frame bracket 100. The lock member 32 is configured to rotate between the latched condition (FIGS. 1-4) and the unlatched condition (FIG. 5). Other constructions of the latch mechanism 30 are within the scope of this disclosure.

Figure 3:
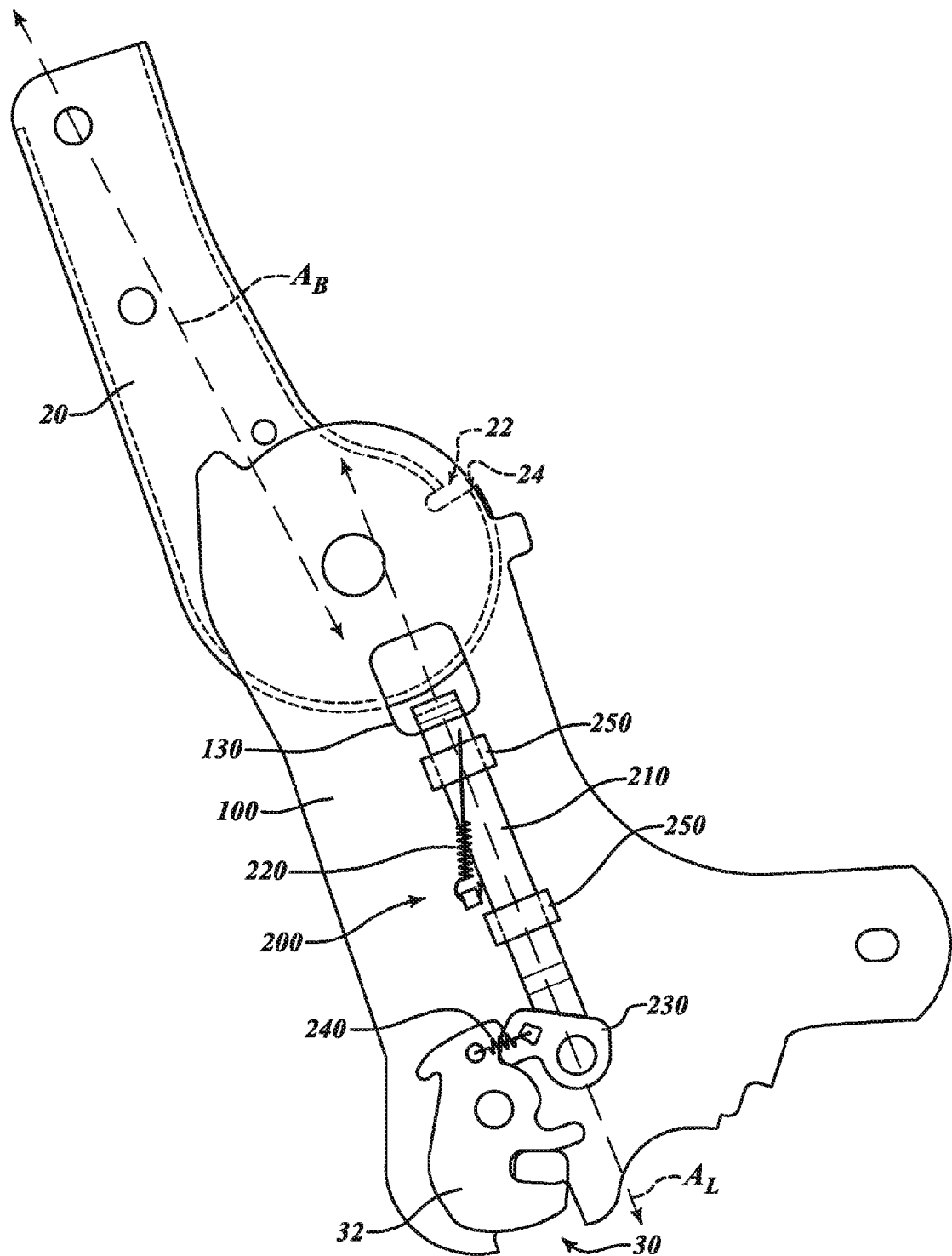
FIG. 3 is a partial schematic view of an example interlock assembly of the vehicle seat of FIG. 1 in the latched condition and the upright position according to the principles of the present disclosure.
Figure 4:
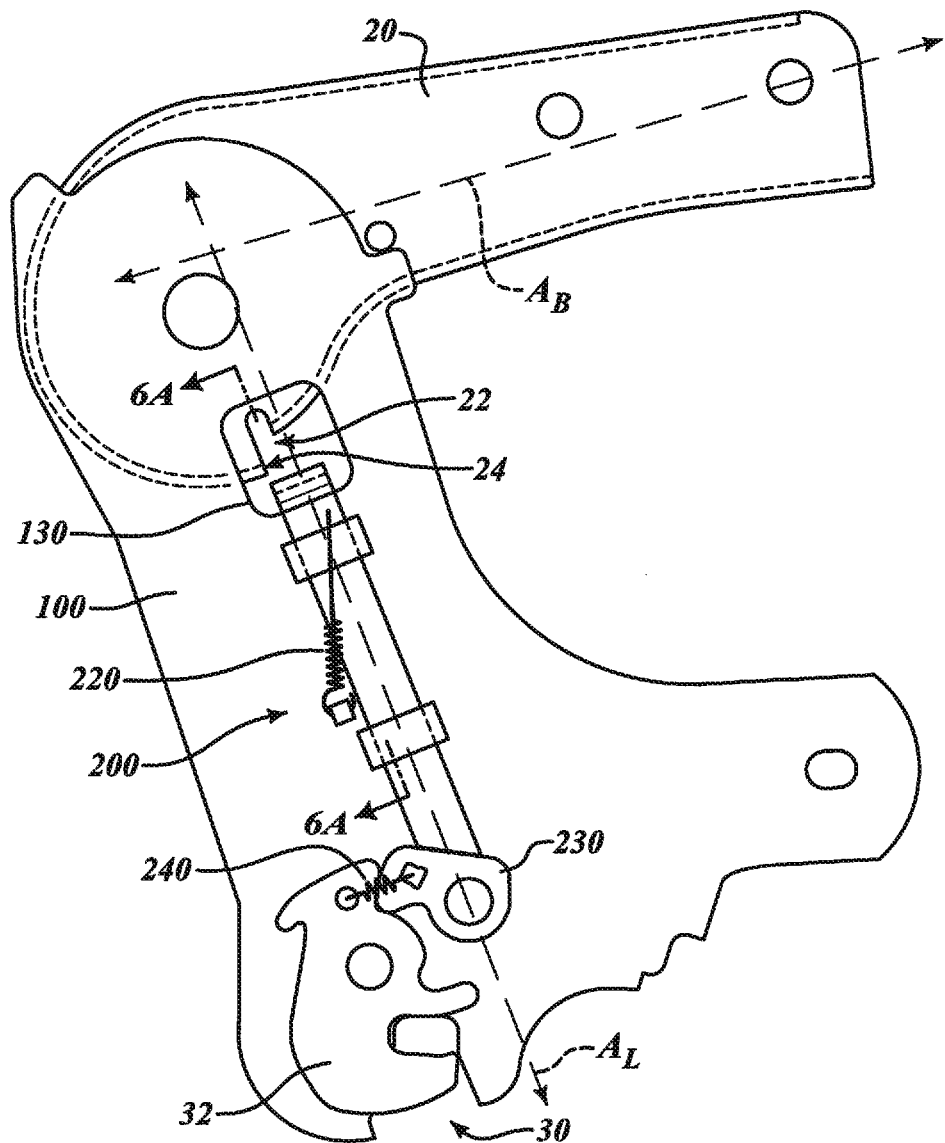
FIG. 4 is a partial schematic view of the example interlock assembly of FIG. 3 with the vehicle seat in the latched condition and the folded position.
Figure 5:
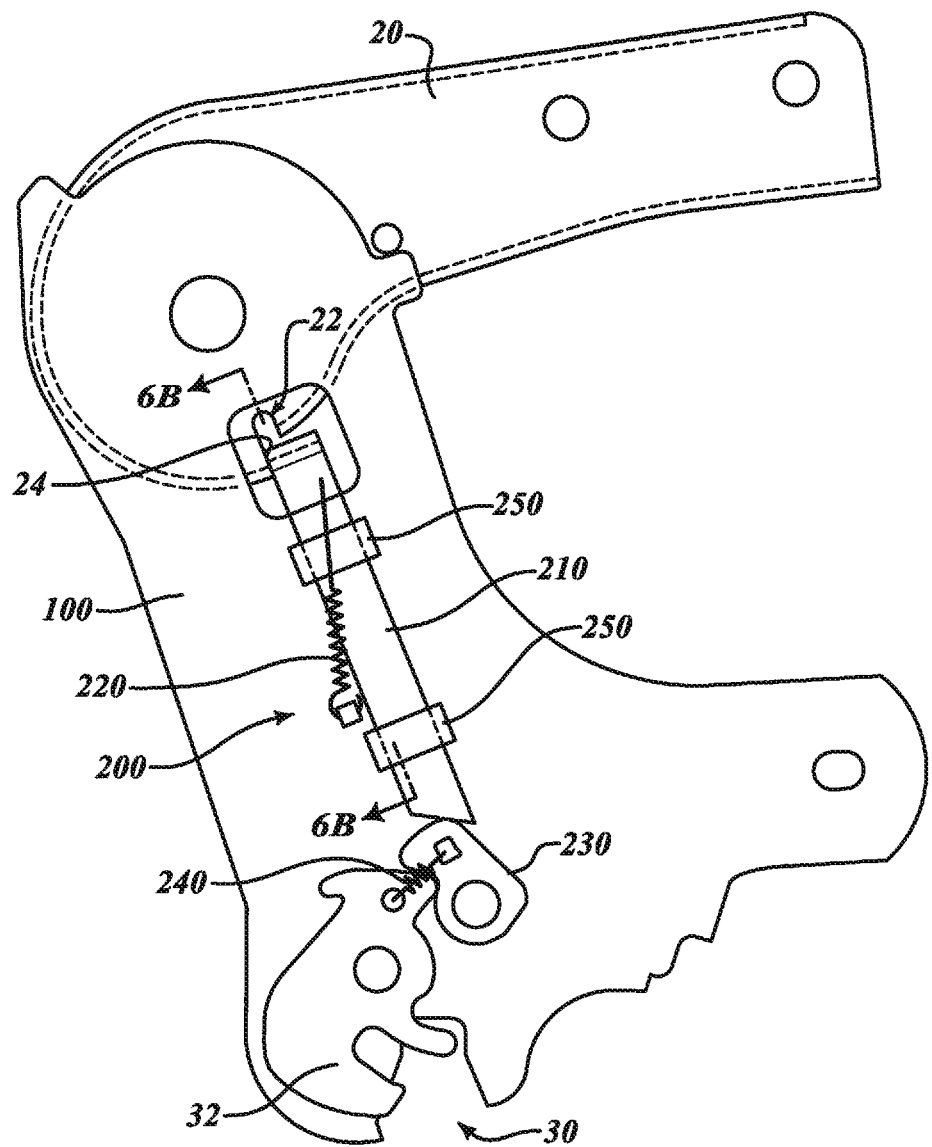
FIG. 5 is a partial schematic view of the example interlock assembly of FIG. 3 with the vehicle seat in the unlatched condition and the folded position.

With further reference to FIGS. 3-5, the vehicle seat 10 further includes an interlock assembly 200 that is configured to inhibit movement of the seat back bracket 20 from the folded position (FIG. 2) to the upright position (FIG. 1) when the latch mechanism 30 is in the unlatched condition. The interlock assembly 200 includes a lever 210 that is movable between an extended position (FIG. 5) and a retracted position (FIGS. 3-4). The interlock assembly 200 further includes a lever biasing member 220 that is coupled to the lever 210 and seat frame bracket 100. The lever biasing member 220 is configured to bias the lever 210 to the retracted position shown in FIGS. 3-4.

In some embodiments, the interlock assembly 200 further includes a pawl 230 that is rotatably coupled to the seat frame bracket 100. The pawl 230 couples the latch mechanism 30 to the lever 210 such that movement of the latch mechanism 30 from the latched condition to the unlatched condition rotates the pawl 230 and moves the lever 210 to the extended position (FIG. 5). Furthermore, the pawl 230 couples the latch mechanism 30 to the lever 210 such that movement of the latch mechanism 30 from the unlatched condition to the latched condition permits the pawl 230 to rotate and the lever 210 to move to the retracted position (FIG. 3-4).

The interlock assembly 200 optionally includes a pawl biasing member 240 that is configured to bias the pawl 230 downward to permit the lever 210 to move to the retracted position. The pawl biasing member 240, e.g., comprises a coil spring that extends between the latch mechanism 30 and pawl 230.

In some embodiments, the lever 210 directly contacts the pawl 230 and/or the pawl 230 directly contacts the latch mechanism 30 (e.g., lock member 32). Furthermore, it should be appreciated that, in certain embodiments, the lever 210 will be directly coupled to the latch mechanism 30 without an intermediary component (such as, the pawl 230). In these embodiments, movement of the latch mechanism 30 from the latched condition to the unlatched condition moves the lever 210 to the extended position (FIG. 5), and movement of the latch mechanism 30 from the unlatched condition to the latched condition permits the lever 210 to move to the retracted position (FIG. 3-4).

The vehicle seat 10 optionally includes a guide mechanism 250 to assist in guiding and/or aligning the lever 210 between the extended to retracted position, and vice-versa, such that the lever 210 does not deviate from the proper alignment. The illustrated guide mechanism 250 is coupled to the seat frame bracket 100 and the lever 210 is positioned between the guide mechanism 250 and the seat frame bracket 100. Other guide mechanisms could be utilized.

Figure 6A:
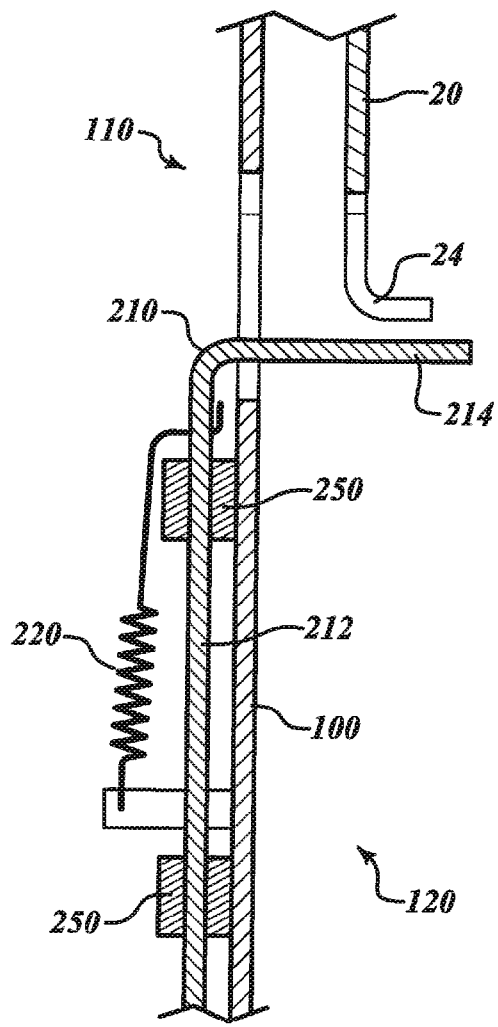
FIG. 6A is a partial sectional view of the example interlock assembly of FIG. 4 taken along line 6A-6A.
Figure 6B:
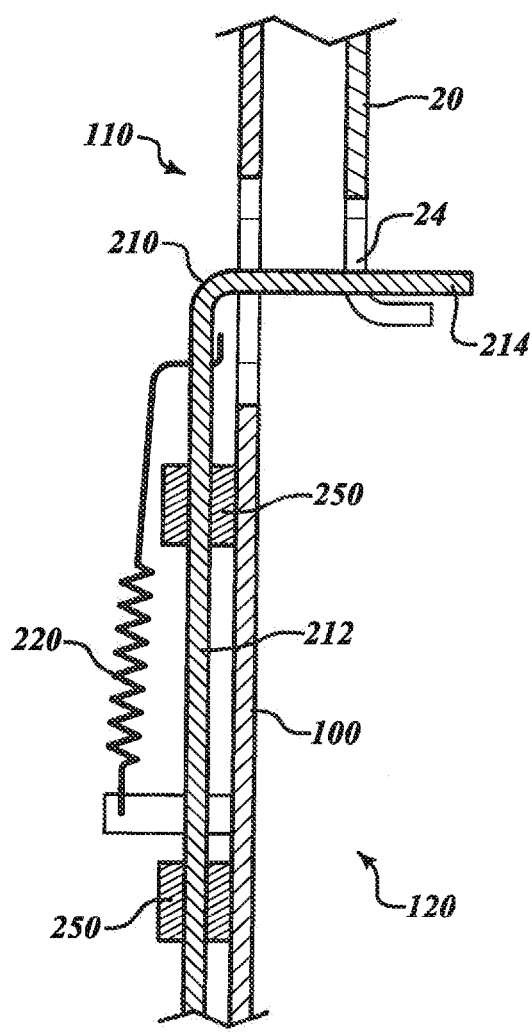
FIG. 6B is a partial sectional view of the example interlock assembly of FIG. 5 taken along line 6B-6B.

The seat back bracket 20 is configured to interact with the lever 210 such that, when the latch mechanism 30 is in the unlatched condition and the lever 210 is in the extended position, the lever 210 inhibits the seat back bracket 20 from moving from the folded to the upright position. In some embodiments and as shown in FIG. 5, the lever 210 will extend into a notch 22 defined by the seat back bracket 20. As best shown in FIGS. 6A and 6B, the seat back bracket 20 defines a contact surface 24 proximate the notch 22. The contact surface 24 will act as a mechanical stop by contacting the lever 210 in the extended condition and will inhibit movement of the seat back bracket 20 from the folded to the upright position.

As best shown in FIGS. 6A and 6B, the seat frame bracket 100 has an outer side 110 and an inner side 120 opposite the outer side 110. Further, the seat frame bracket 100 defines an aperture 130. The illustrated lever 210 has a right-angle construction in which a longitudinal portion 212 of the lever 210 is substantially orthogonal to a horizontal portion 214 of the lever 210. The lever 210 is arranged on the outer side 110 and the seat back bracket 20 is arranged on the inner side 120. In order for the lever 210 to interact with the seat back bracket 20 and inhibit its rotation under certain circumstances, the horizontal portion 214 extends from the outer side 110 to the inner side 120 through the aperture 130. In this manner, the lever 210 and the seat back bracket 20 are capable of interacting even when arranged on opposite sides of the seat frame bracket 100.

In some examples, the lever 210 is arranged to move in an upward direction, that is, in a direction that is substantially consistent with the direction in which the seat back bracket 20 extends in the upright position. Specifically, the seat back bracket 20 defines a longitudinal axis $A_B$ and the lever 210 defines a longitudinal axis $A_L$. When the seat back 12 and the seat back bracket 20 are in the upright position (FIG. 3), the longitudinal axes $A_B$ and $A_L$ are substantially parallel (e.g., within fifteen degrees of parallel). When the seat back 12 and the seat back bracket 20 are in the folded position (FIG. 4), the longitudinal axes $A_B$ and $A_L$ are substantially perpendicular (e.g., within fifteen degrees of perpendicular).

Operation of the vehicle seat 10 and the interlock assembly 200 will now be discussed in relation to FIGS. 3-5. FIG. 3 corresponds to the vehicle seat 10 being in the latched condition (with the latching mechanism 30 in the latched condition, e.g., with the vehicle seat 10 secured to the vehicle floor 16) and the upright position (with the seat back bracket 20 in the upright position). In the latched condition, the latching mechanism 30 interacts with the lever 210 (e.g., via the pawl 230) such that the lever 210 is permitted to move or is moved to the retracted position. In the retracted position, the lever 210 does not contact or otherwise interact with the seat back bracket 20, thereby permitting the seat back bracket 20 to freely move between the upright and folded positions. FIG. 4 corresponds to the vehicle seat 10 being in the latched condition and the folded position.

FIG. 5 corresponds to the vehicle seat 10 being in the unlatched condition (with the latching mechanism 30 in the unlatched condition, e.g., with the vehicle seat 10 not secured to the vehicle floor 16) and the seat back bracket 20 in the folded position. In the unlatched condition, the latching mechanism 30 interacts with the lever 210 (e.g., via the pawl 230) such that the lever 210 is moved to the extended position. In the extended position, the lever 210 will interact with the seat back bracket 20 (e.g., by the contact surface 24 acting as a mechanical stop), thereby inhibiting the seat back bracket 20 from moving from the folded position to the upright position.

In some embodiments, the latch mechanism 30 is inhibited from moving from the latched condition (FIGS. 3-4) to the unlatched condition (FIG. 5) when the seat back bracket 20 is in the upright position. As described above, movement of the latch mechanism 30 from the latched to the unlatched condition moves the lever 210 to the extended position. When the seat back bracket 20 is in the upright position, however, movement of the lever 210 from the retracted position to the extended position is inhibited by the lever 210 contacting the seat back bracket 20. When the lever 210 cannot be extended, the latching mechanism 30 cannot move from the latched to the unlatched condition such that, e.g., the vehicle seat 10 cannot be released from the vehicle floor 16.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle seat, comprising:
   a latch mechanism movable between a latched condition and an unlatched condition;
   a seat frame bracket coupled to the latch mechanism and configured to be releasably secured to a vehicle floor via the latch mechanism;
   a seat back bracket rotatably coupled to the seat frame bracket, the seat back bracket being movable between an upright position and a folded position; and
   an interlock assembly configured to inhibit movement of the seat back bracket from the folded position to the upright position when the latch mechanism is in the unlatched condition, the interlock assembly including:
   a lever movable between an extended position and a retracted position,
   a lever biasing member coupled to the lever and seat frame bracket and configured to bias the lever to the retracted position, and
   a pawl rotatably coupled to the seat frame bracket, the pawl coupling the latch mechanism to the lever such that movement of the latch mechanism from the latched condition to the unlatched condition rotates the pawl and moves the lever to the extended position, and movement of the latch mechanism from the unlatched condition to the latched condition permits the pawl to rotate and the lever to move to the retracted position, wherein the lever directly contacts the pawl.

2. The vehicle seat of claim 1, wherein the interlock assembly further includes a pawl biasing member configured to bias the pawl to permit the lever to move the retracted position.

3. The vehicle seat of claim 2, wherein the pawl biasing member comprises a coil spring extending between the latch mechanism and the pawl.

4. The vehicle seat of claim 1, wherein the lever in the extended position extends into a notch defined by the seat back bracket.

5. The vehicle seat of claim 4, wherein the seat back bracket defines a contact surface proximate the notch, the contact surface contacting the lever in the extended position and acting as a mechanical stop such that the seat back bracket is inhibited from moving from the folded position to the upright position.

6. The vehicle seat of claim 1, wherein the latch mechanism is inhibited from moving from the latched condition to the unlatched condition when the seat back bracket is in the upright position.

7. The vehicle seat of claim 6, wherein, when the seat back bracket is in the upright position, movement of the lever from the retracted position to the extended position is inhibited by contacting the seat back bracket.

8. The vehicle seat of claim 1, wherein the latching mechanism includes a lock member rotatably secured to the seat frame bracket, the lock member being configured to rotate between the latched condition and the unlatched condition.

9. The vehicle seat of claim 8, wherein the lock member directly contacts the pawl and the pawl directly contacts the lever.

10. The vehicle seat of claim 1, further comprising a guide mechanism coupled to the seat frame bracket, the lever being positioned between the guide mechanism and the seat frame bracket.

11. A vehicle seat, comprising:
- a latch mechanism movable between a latched condition and an unlatched condition;
- a seat frame bracket coupled to the latch mechanism and configured to be releasably secured to a vehicle floor via the latch mechanism;
- a seat back bracket rotatably coupled to the seat frame bracket, the seat back bracket being movable between an upright position and a folded position; and
- an interlock assembly configured to inhibit movement of the seat back bracket from the folded position to the upright position when the latch mechanism is in the unlatched condition and to inhibit movement of the latch mechanism from the latched condition to the unlatched condition when the seat back bracket is in the upright position, the interlock assembly including:
  - a lever movable between an extended position and a retracted position, the lever being coupled to the latch mechanism such that movement of the latch mechanism from the latched condition to the unlatched condition moves the lever to the extended position, and movement of the latch mechanism from the unlatched condition to the latched condition permits the lever to move to the retracted position, wherein the lever in the extended position extends into a notch defined by the seat back bracket.

12. The vehicle seat of claim 11, wherein the seat back bracket defines a contact surface proximate the notch, the contact surface contacting the lever in the extended position and acting as a mechanical stop such that the seat back bracket is inhibited from moving from the folded position to the upright position.

13. The vehicle seat of claim 11, wherein, when the seat back bracket is in the upright position, movement of the lever from the retracted position to the extended position is inhibited by contacting the seat back bracket.

14. The vehicle seat of claim 11, further comprising a lever biasing member coupled to the lever and seat frame bracket and configured to bias the lever to the retracted position.

15. The vehicle seat of claim 11, further comprising a guide mechanism coupled to the seat frame bracket, the lever being positioned between the guide mechanism and the seat frame bracket.

16. The vehicle seat of claim 11, wherein the interlock assembly further includes a pawl rotatably coupled to the seat frame bracket and directly contacting the lever, the pawl coupling the latch mechanism to the lever such that movement of the latch mechanism from the latched condition to the unlatched condition rotates the pawl and moves the lever to the extended position, and movement of the latch mechanism from the unlatched condition to the latched condition permits the pawl to rotate and the lever to move to the retracted position.

* * * * *